(12) United States Patent
Han

(10) Patent No.: US 8,954,676 B2
(45) Date of Patent: Feb. 10, 2015

(54) CACHE WITH SCRATCH PAD MEMORY STRUCTURE AND PROCESSOR INCLUDING THE CACHE

(71) Applicant: Electronics and Telecommunications Research Institute, Daejeon (KR)

(72) Inventor: Jin Ho Han, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 164 days.

(21) Appl. No.: 13/680,243

(22) Filed: Nov. 19, 2012

(65) Prior Publication Data

US 2013/0238859 A1     Sep. 12, 2013

(30) Foreign Application Priority Data

Mar. 6, 2012 (KR) .................. 10-2012-0023051

(51) Int. Cl.
*G06F 12/08* (2006.01)

(52) U.S. Cl.
CPC .......... *G06F 12/0875* (2013.01); *G06F 12/084* (2013.01)
USPC ........................................ 711/125; 711/130

(58) Field of Classification Search
CPC ................ G06F 12/0875; G06F 12/084
USPC .................................. 711/125, 130
See application file for complete search history.

(56) References Cited

U.S. PATENT DOCUMENTS

| 7,568,086 | B2 | 7/2009 | Ramchandran |
| 2006/0101206 | A1 | 5/2006 | Wood et al. |
| 2009/0172289 | A1* | 7/2009 | Yamamura et al. ........... 711/128 |
| 2011/0131381 | A1* | 6/2011 | Kaplan ......................... 711/141 |

OTHER PUBLICATIONS

Jason Cong et al., "An Energy-Efficient Adaptive Hybrid Cache", Proceedings of the 17$^{th}$IEEE/ACM International Symposium on Low-Power Electronics and Design, Aug. 1-3, 2011, pp. 67-72.

* cited by examiner

*Primary Examiner* — Than Nguyen
(74) *Attorney, Agent, or Firm* — Rabin & Berdo, P.C.

(57) ABSTRACT

Disclosed are a cache with a scratch pad memory (SPM) structure and a processor including the same. The cache with a scratch pad memory structure includes: a block memory configured to include at least one block area in which instruction codes read from an external memory are stored; a tag memory configured to store an external memory address corresponding to indexes of the instruction codes stored in the block memory; and a tag controller configured to process a request from a fetch unit for the instruction codes, wherein a part of the block areas is set as a SPM area according to cache setting input from a cache setting unit. According to the present invention, it is possible to reduce the time to read instruction codes from the external memory and realize power saving by operating the cache as the scratch pad memory.

8 Claims, 3 Drawing Sheets

CACHE WITH SCRATCH PAD MEMORY STRUCTURE AND PROCESSOR INCLUDING THE CACHE

CROSS-REFERENCES TO RELATED APPLICATIONS

The present application claims priority under 35 U.S.C 119(a) to Korean Application No. 10-2012-0023051, filed on Mar. 6, 2012, in the Korean Intellectual Property Office, which is incorporated herein by reference in its entirety set forth in full.

BACKGROUND

Exemplary embodiments of the present invention relate to a cache with a scratch pad memory structure and a processor including the same, and more particularly, to a cache with a scratch pad memory structure in which a scratch pad memory function is added to a cache structure and a processor including the same.

A processor is an apparatus that reads and analyzes instructions stored in an external storage apparatus to perform a specific operation using an operand designated by instructions and then, perform the specific function by programs stored in the external storage apparatus.

The processor is applied to various applications to perform complex and various functions. As the functions, the processor has been used for various applications, such as video encoding and decoding, audio encoding and decoding, network packet routing, system control, and the like. In order for the processor to use various applications as described above, there is a need to process instruction code patterns having various types suitable for each application.

In addition, since the processor is used in an apparatus supplying power in various forms from a base station for wireless communication to an apparatus supplied with power by a battery such as a wireless communication terminal, there is a need to increase performance of processor and reduce power consumption thereof.

The processor basically includes a core, a translation lookaside buffer (TLB), and a cache. Operations to be performed by the processor are defined by a combination of a plurality of instructions. That is, the instructions are stored in a memory and sequentially input to the processor and thus, the processor performs specific operations for each clock cycle.

The TLB serves to convert virtual address into physical address so as to drive operating system based applications. The cache temporarily stores the instructions stored in the external memory in a chip to increase a speed of the processor.

The core consumes much time of 10 to 100 cycles so as to read data from the memory, which is a factor of making the core be in an idle state for a long period of time. The cache is a unit for storing the instructions to be used by the core in a memory in a chip directly connected to the core. The reason why the cache is used is that the external memory may store large-capacity instructions of several Gbytes (256 Gbytes or more) or more, while the memory that can be implemented in the chip is about several Mbytes. That is, the cache serves to temporarily store an external large-capacity memory in the chip.

Therefore, the cache has a large effect on the performance of the processor. When the core requests the specific instructions, since the instructions are read from the external memory if there are no specific instructions requested by the processor in the cache, the cache is in an idle state while the instructions are read from the external memory, the processor transmits an address to the cache for each request, and the cache stores addresses corresponding to indexes for instruction codes stored therein, that is, tags in a tag memory. Further, each time the instruction code of the processor is requested, there is a need to access the tag memory for comparing the address with the tag. In addition, there is need to store the tags corresponding to the stored instruction codes.

In connection with this, when the specific applications are performed in advance, a method for compressing current cache memory data by calculating compression costs and dynamically supplementing it is suggested, which is not a method for actually reducing cache memory data.

In addition, a method for binding multiple instructions into a group and storing indexes therefor in an instruction memory has been proposed. However, when the instructions are read through the indexes, there is a need to load from the memory as many as the number of instructions within the group and this method is reducing the size of the instruction memory itself, and therefore, cannot actually save power.

The above-mentioned technical configuration is a background art for helping understanding of the present invention and does not mean related arts well known in a technical field to which the present invention pertains.

SUMMARY

An embodiment of the present invention is directed to a cache with a scratch pad memory structure capable of saving power using a variable cache structure capable of operating a memory in a cache as a scratch pad memory at the time of reading consecutive large-capacity instruction codes and a processor including the same.

An embodiment of the present invention relates to a cache with a scratch pad memory (SPM) structure, including: a block memory configured to include at least one block area in which instruction codes read from an external memory are stored; a tag memory configured to store an external memory address corresponding to indexes of the instruction codes stored in the block memory; and a tag controller configured to process a request from a fetch unit for the instruction codes, wherein a part of the block areas is set as a SPM area according to cache setting input from a cache setting unit.

The block memory may include a SPM enable unit that set the block area as a cache area or a SPM area according to the cache setting.

The cache is operated as a SPM mode or a cache mode according to the cache setting input from the cache setting unit.

When the cache is operated as a SPM mode, the fetch unit may directly access the SPM area to read the instruction codes.

When one of blocks belonging to the SPM area completes the reading of the instruction codes from the external memory, the fetch unit may read the instruction codes, deviating from an idle state.

Other blocks belonging to the SPM area may continuously read the remaining instruction codes from the external memory while the fetch unit reads the instruction codes from the blocks in which the reading of the instruction codes from the external memory is completed.

When the cache is operated as the SPM mode, the tag memory and the tag controller may be inactivated.

When the cache is operated as the cache mode, the tag memory and the tag controller may be activated.

Another embodiment of the present invention relates to a processor, including; an external memory configured to store programs; a core configured to read instruction codes and perform an operation according to an implemented algorithm; a translation lookaside buffer (TLB) configured to convert a virtual address received from the core into a physical address; a cache with SPM configured to read a part of the programs stored in the external memory according to a request from the core based on a physical address received from the TLB to transmit instruction codes to the core; and a cache setting unit configured to operate the cache with SPM as a cache mode or a SPM mode and divide blocks within a block memory of the cache with SPM into a cache area and a SPM area.

The cache with SPM may have a variable cache structure that configured to activate a tag controller and a tag memory in the cache mode to access the block memory through the tag controller and the tag memory, and configured to inactivate the tag controller and the tag memory in the SPM mode to access the block memory directly.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
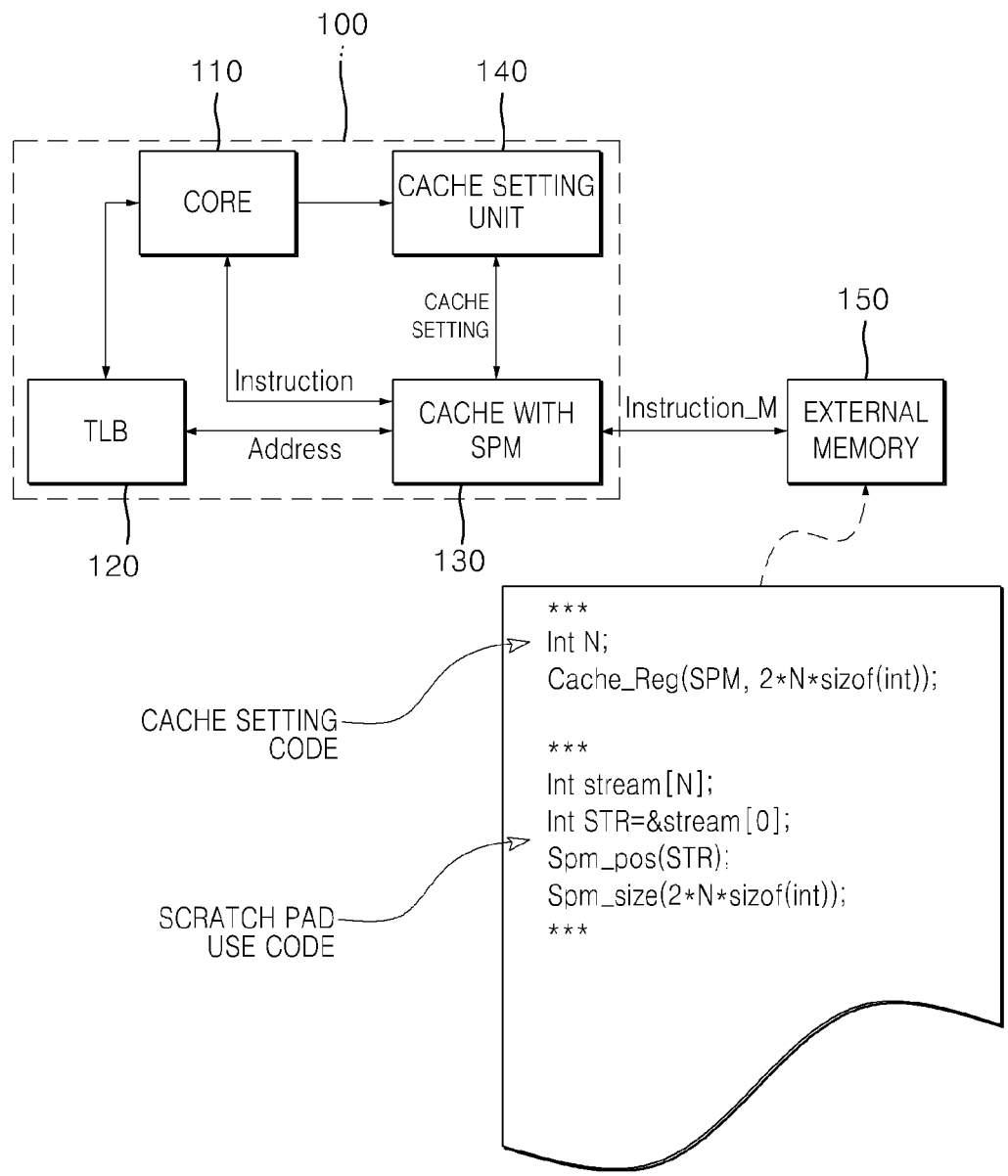
FIG. 1 is a block diagram of a processor including a cache with a scratch pad memory structure in accordance with an embodiment of the present invention.

Hereinafter, a cache with a scratch pad memory structure and a processor including the same in accordance with an embodiment of the present invention will be described in detail with reference to the accompanying drawings. During the process, a thickness of lines, a size of components, or the like, illustrated in the drawings may be exaggeratedly illustrated for clearness and convenience of explanation. Further, the following terminologies are defined in consideration of the functions in the present invention and may be construed in different ways by intention or practice of users and operators. Therefore, the definitions of terms used in the present description should be construed based on the contents throughout the specification.

FIG. 1 is a block diagram of a processor including a cache with a scratch pad memory structure in accordance with an embodiment of the present invention.

Referring to FIG. 1, a processor 100, a core 110, a TLB 120, a cache with scratch pad memory (cache with SPM) 130, a cache setting unit 140, and an external memory 150 are illustrated.

The processor 100 in accordance with the embodiment of the present invention operates all or a part of the area in which instructions are stored in the cache with SPM 130 as a scratch pad memory using programming to prevent performance of the processor 100 from being degraded and save consumed power.

As illustrated in FIG. 1, the processor 100 includes the core 110, the TLB 120, the cache with SPM 130, and the cache setting unit 140, and is connected to the external memory 150.

The core 110 reads instruction to perform an operation according to the implemented algorithm.

The TLB 120 converts a visual address received from the core 110 into a physical address and transfers the converted address to the cache with SPM 130.

The cache with SPM 130 reads a part of the programs stored in the external memory 150 according to the request of the core 110 and transfers the instruction codes to the core 110.

In detail, the cache with SPM 130 reads the instruction codes from the external memory 150 based on the physical address transferred from the TLB 120 and transfers the instruction codes to the core 110.

In this case, the cache with SPM 130 may read the instruction codes through an external memory instruction Instruction_M from the external memory 150 and transfer the instruction codes to the core 110 through instructions.

Meanwhile, the programs stored in the external memory 150 include a cache setting code and a scratch pad use code as illustrated in FIG. 1.

Therefore, the core 110 may read the instruction codes including the cache setting code and set the cache setting unit 140 to control the cache with SPM 130.

The cache setting unit 140 sets a scratch pad memory enable unit (SPM enable unit) 236 in the cache with SPM 130 through the cache setting to operate the cache with SPM 130 as a cache mode or a scratch pad memory mode (SPM mode).

That is, blocks within a block memory 230 of the cache with SPM 130 are divided into a cache area 232 and a scratch pad memory area (SPM area) 234.

Hereinafter, the core 110 reads the scratch pad use code for controlling the scratch pad memory and allocates the SPM area 234 through the scratch pad use code.

Thereafter, the core 110 designates a location, and the like, in the external memory 150 of the instruction codes to be filled in the corresponding area and then, reads the instruction codes from the SPM area 234 within the cache with SPM 130.

Figure 2:
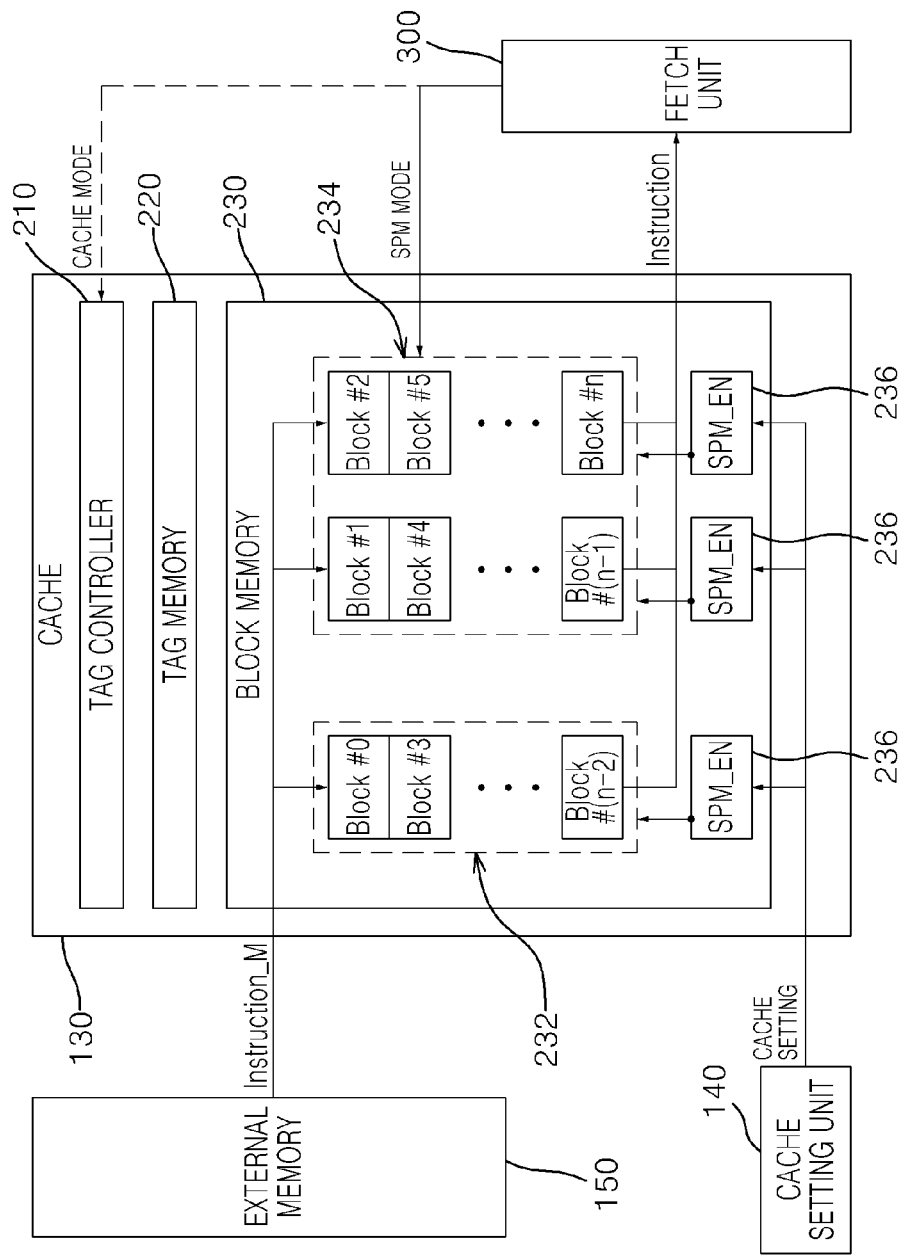
FIG. 2 is a block diagram illustrating the cache with the scratch pad memory structure in accordance with the embodiment of the present invention.

FIG. 2 is a diagram illustrating the cache with the scratch pad memory structure in accordance with the embodiment of the present invention.

Referring to FIG. 2, the cache with SPM 130, a tag controller 210, a tag memory 220, the block memory 230, the cache area 232, the SPM area 234, the SPM enable unit 236, the external memory 150, the cache setting unit 140, and a fetch unit 300 are illustrated.

The cache with SPM 130 in accordance with the embodiment of the present invention includes the tag controller 210, the tag memory 220, and the block memory 230.

The tag controller 210 processes the instruction code request from the fetch unit 300 in the case of the cache mode.

The tag memory 220 stores the external memory addresses corresponding to the indexes of the instruction codes stored in the block memory 230.

The block memory 230 stores the instruction codes read from the external memory 150. The block memory 230 includes a plurality of blocks in which the instruction codes are stored and includes the scratch pad memory enable unit 236 capable of setting each block area.

The fetch unit 300, which is a unit present in the processor, requests the instruction codes performed by the core 110 to the cache with SPM 130.

The scratch pad memory enable unit 236 sets the corresponding block within the block memory 230 as the SPM area 234 according to the cache setting from the cache setting unit 140.

The request from the fetch unit 300 performed later is operated as the SPM mode or the cache mode according to the requested address.

In the case of the cache mode, the corresponding instruction codes are read by accessing the block memory 230 using the tag controller 210 and the tag memory 220 and therefore, the tag controller 210 and the tag memory 220 are activated.

On the other hand, in the case of the SPM mode, the instruction codes present in the SPM area 234 are read by accessing the block memory 230 directly. In this case, the tag controller 210 and the tag memory 220 are inactivated.

In the case of the SPM mode, the channel for reading from the external memory 150 and the channel for writing into the fetch unit 300 are separate between the blocks. In addition, when at least one block that contains the instruction codes requested by the fetch unit 300 completes the reading from the external memory 150, the fetch unit 300 may escape from the idle state and read the requested instruction codes, and the requested instruction codes remaining in the external memory 150 may be continuously read into the cache with SPM 130.

As described above, in the SPM mode, the block memory 230 of the corresponding SPM area 234 is directly accessed using only the setting information in the cache setting unit 140 without using the tag controller 210 and the tag memory 220 and therefore, only a small circuit is used, thereby reducing the power consumption.

In addition, it is possible to shorten the time consumed to secure the instruction codes requested by the fetch unit 300 due to the use of the memory physically separated, thereby increasing the performance of the processor.

Figure 3:
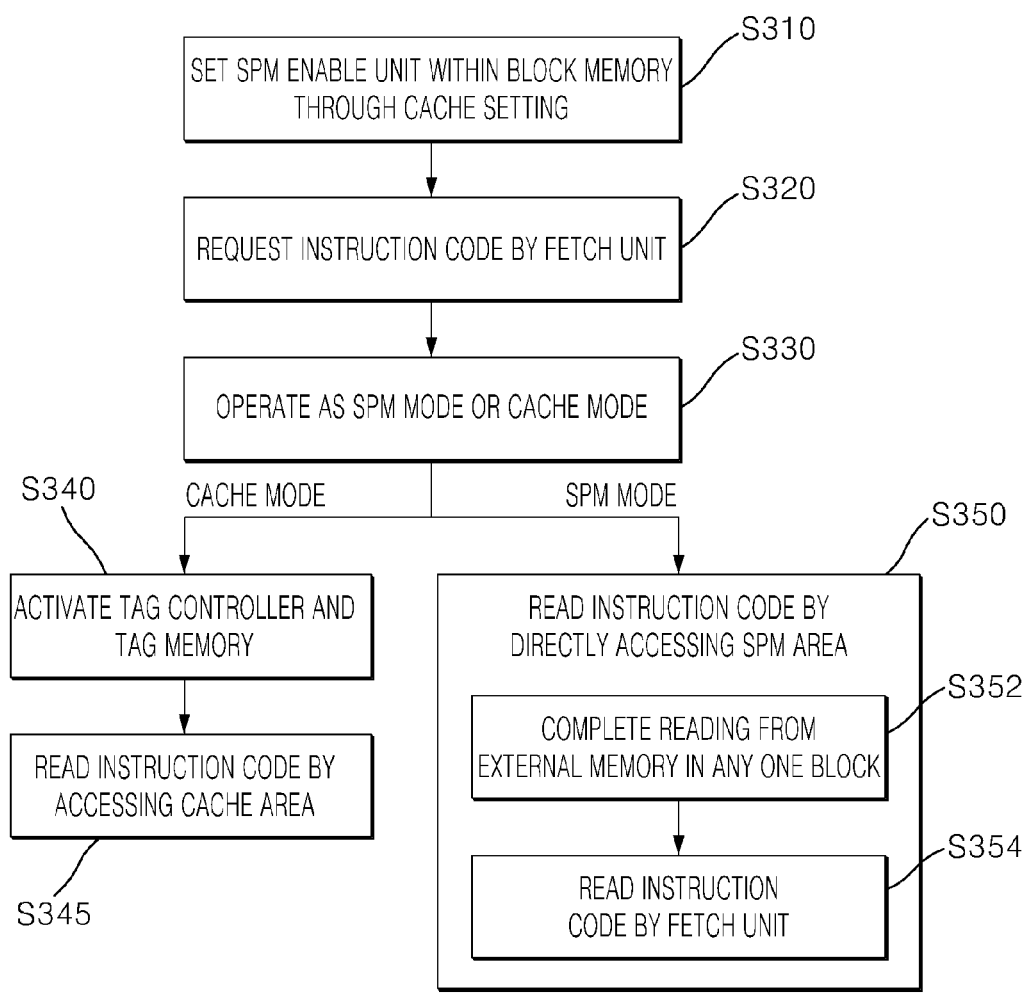
FIG. 3 is a block diagram illustrating an instruction processing method in the processor including the cache with the scratch pad memory structure in accordance with the embodiment of the present invention.

FIG. 3 is a flow chart of a method for processing instructions in a processor using the cache with the scratch pad memory structure in accordance with the embodiment of the present invention.

In S310, the processor performs the cache setting using the cache setting unit 140 to set the scratch pad memory enable unit 236 setting the areas of each block in the block memory 230. To this end, the cache with SPM 130 has the variable cache structure in which all or a part of each block area within the block memory 230 can be set as the SPM area 234.

In S320, the fetch unit 300 requests the instruction codes to be performed by the processor from the cache with SPM 130.

In S330, the request from the fetch unit 300 is operated at the SPM mode or the cache mode according to the requested address.

When being operated as the cache mode, in S340, the tag controller 210 and the tag memory 220 within the cache with SPM 130 are activated and in S342, the corresponding instruction codes are read by accessing the cache area 232 of the block memory 230 using the tag controller 210 and the tag memory 220.

When being operated as the SPM mode, in S350, the corresponding instruction codes are read by accessing the SPM area 234 of the block memory 230 directly. In this case, the tag controller 210 and the tag memory 220 within the cache with SPM 130 are inactivated.

Further, in S352, when at least one of the blocks that contains the instruction codes requested by the fetch unit 300 completes the reading from the external memory 150, the fetch unit 300 may escape from the idle state and read the requested instruction codes and in S354, the requested instruction codes remaining in the external memory 150 may be continuously read into the cache with SPM 130.

In accordance with the embodiment of the present invention, when developing programs through an operating system, compiler, or otherwise, the direct analysis, statistics for the instruction codes performed by the processor can be provided to a program developer.

In addition, the frequently performed and consecutive instruction codes can be detected and before the actual algorithm is performed according to the instruction codes within the programs, the cache with SPM 130 is set and thus, the SPM area 234 is set properly.

In detail, the instruction codes store the setting value in a cache setting register through a store unit before the algorithm is performed and when the core requests the instruction code request set as the SPM area 234 to the cache with SPM 130, the cache with SPM 130 is operated as the SPM mode reads the instruction codes into the scratch pad memory from the external memory 150.

In accordance with the embodiments of the present invention, it is possible to reduce the time to read the instruction codes from the external memory by operating the cache as the scratch pad memory at the time of reading frequently performed and consecutive large-capacity instruction codes and therefore, prevent the performance of the processor from being degraded.

In addition, in accordance with the embodiments of the present invention, it is possible to realize power saving by using the variable cache structure capable of operating the cache as the scratch pad memory.

Although the embodiments of the present invention have been described in detail, they are only examples. It will be appreciated by those skilled in the art that various modifications and equivalent other embodiments are possible from the present invention. Accordingly, the actual technical protection scope of the present invention must be determined by the spirit of the appended claims.

What is claimed is:

1. A cache with a scratch pad memory (SPM) structure, comprising:
a block memory including a block area for storing instruction codes read from an external memory;
a SPM enable unit configured to select one of a cache mode and a SPM mode for the block area;
a tag memory configured to store external memory addresses corresponding to indexes of the instruction codes stored in the block memory; and
a tag controller configured to process a request from a fetch unit for the instruction codes, wherein
the block area is configured to, upon detecting that the SPM enable unit selects the SPM mode, permit direct access of the fetch unit to the block area, without activating the tag memory and the tag controller, to read the instruction codes stored therein.

2. The cache of claim 1, wherein the SPM enable unit selects the SPM mode or the cache mode according to a cache setting input from a cache setting unit.

3. The cache of claim 1, wherein the block area is configured to, upon finishing reading the instruction codes from the external memory, and upon detecting that the SPM enable unit selects the SPM mode, permit the fetch unit escaping from an idle state to read from the block area the instruction codes store therein.

4. The cache of claim 3, wherein the block memory further comprises another block area that is configured, when working in the SPM mode, to store another piece of instruction codes from the external memory, while the fetch unit reads from the block area the instruction codes stored therein.

5. The cache of claim 1, wherein when the cache is operated in the cache mode, the tag memory and the tag controller are activated.

6. A processor, comprising;
an external memory configured to store instruction codes;
a core configured to read the instruction codes;
a translation lookaside buffer (TLB) configured to convert a virtual address received from the core into a physical address;
a cache with a scratch pad memory (SPM) structure, configured to read the instruction codes stored in the external memory according to a request from the core based on the physical address received from the TLB to thereby transmit the instruction codes to the core, the cache including
   a block memory including a block area for storing the instruction codes read from the external memory;
   a tag memory configured to store external memory addresses corresponding to indexes of the instruction codes stored in the block memory; and
   a tag controller configured to process a request from a fetch unit for the instruction codes; and
a cache setting unit configured to select a working mode of the block area of the cache as one of a cache mode and a SPM mode, wherein
the block area is configured to, upon detecting that the cache works in the SPM mode, permit direct access of the fetch unit to the block area, without activating the tag memory and the tag controller, to read the instruction codes stored therein.

7. The processor of claim 6, wherein the cache with the SPM structure is configured to activate the tag controller and the tag memory in the cache mode to access the block memory through the tag controller and the tag memory.

8. The processor of claim 6, wherein the block memory further comprises another block area that is configured, when working in the SPM mode, to store another piece of instruction codes from the external memory, while the fetch unit reads from the block area the instruction codes stored therein.

* * * * *